(No Model.) 3 Sheets—Sheet 1.

A. WEMPLE.
MACHINE FOR CUTTING GRAIN.

No. 251,012. Patented Dec. 13, 1881.

Witnesses
Albert H. Adams
Edgar T. Bond

Inventor:
Andrew Wemple (No Model.) 3 Sheets—Sheet 2.

A. WEMPLE.
MACHINE FOR CUTTING GRAIN.

No. 251,012. Patented Dec. 13, 1881.

Witnesses:
Albert H. Adams
Edgar T. Bond

Inventor:
Andrew Wemple (No Model.)  3 Sheets—Sheet 3.

A. WEMPLE.
MACHINE FOR CUTTING GRAIN.

No. 251,012.  Patented Dec. 13, 1881.

Witnesses:
Albert H. Adams.
Edgar T. Bond.

Inventor:
Andrew Wemple

UNITED STATES PATENT OFFICE.

ANDREW WEMPLE, OF CHICAGO, ILLINOIS, ASSIGNOR OF ONE-HALF TO EDWARD P. HATCH, OF SAME PLACE.

MACHINE FOR CUTTING GRAIN.

SPECIFICATION forming part of Letters Patent No. 251,012, dated December 13, 1881.

Application filed July 20, 1881. (No model.)

*To all whom it may concern:*

Be it known that I, ANDREW WEMPLE, residing at Chicago, in the county of Cook and State of Illinois, and a citizen of the United States, have invented new and useful Improvements in Machines for Cutting Grain, of which the following is a full description, reference being had to the accompanying drawings, in which—

Figure 1:
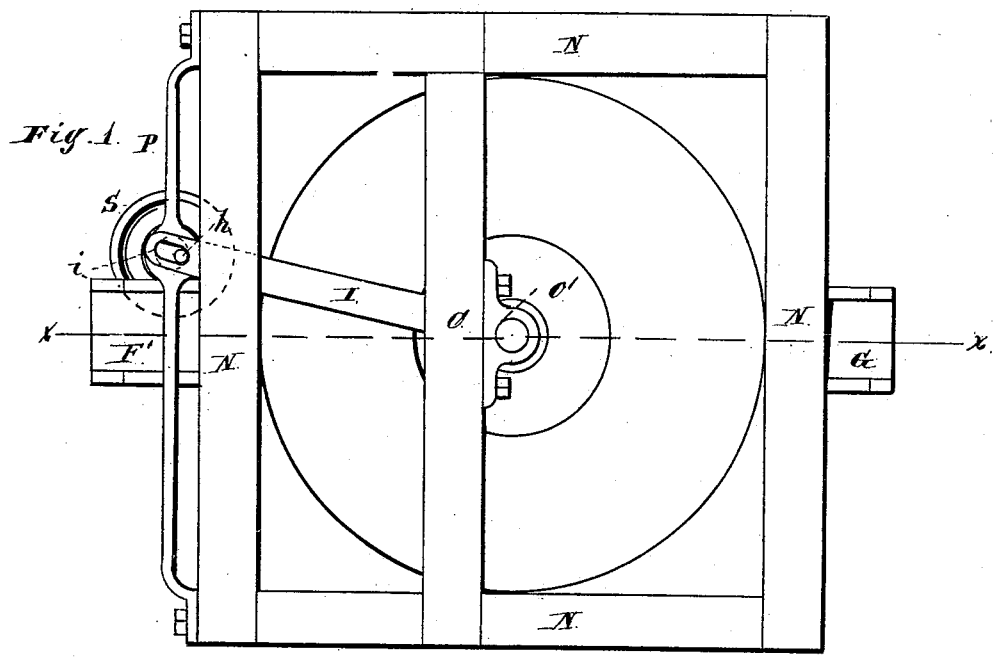
Figure 2:
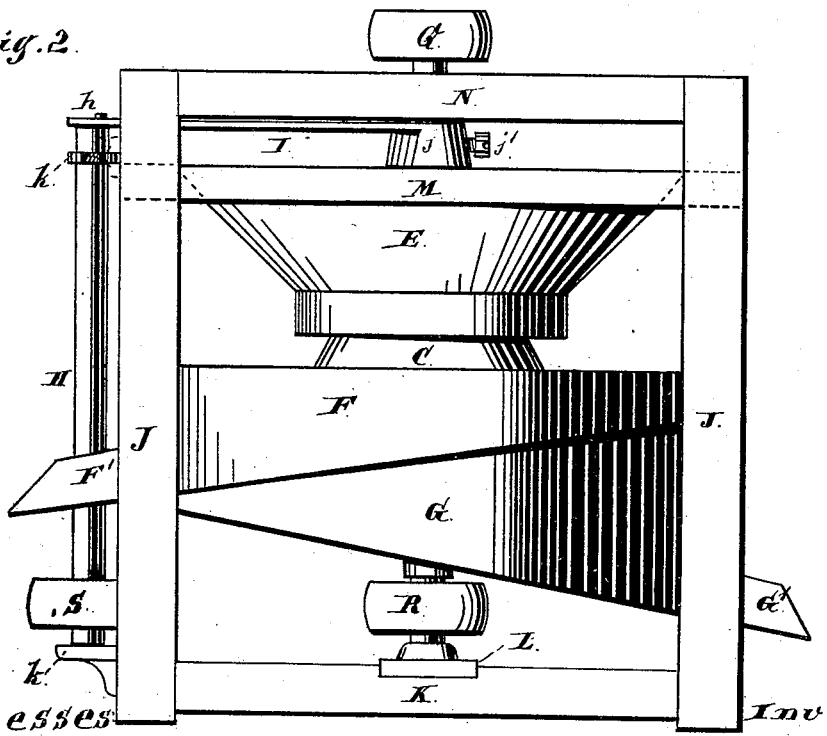
Figure 3:
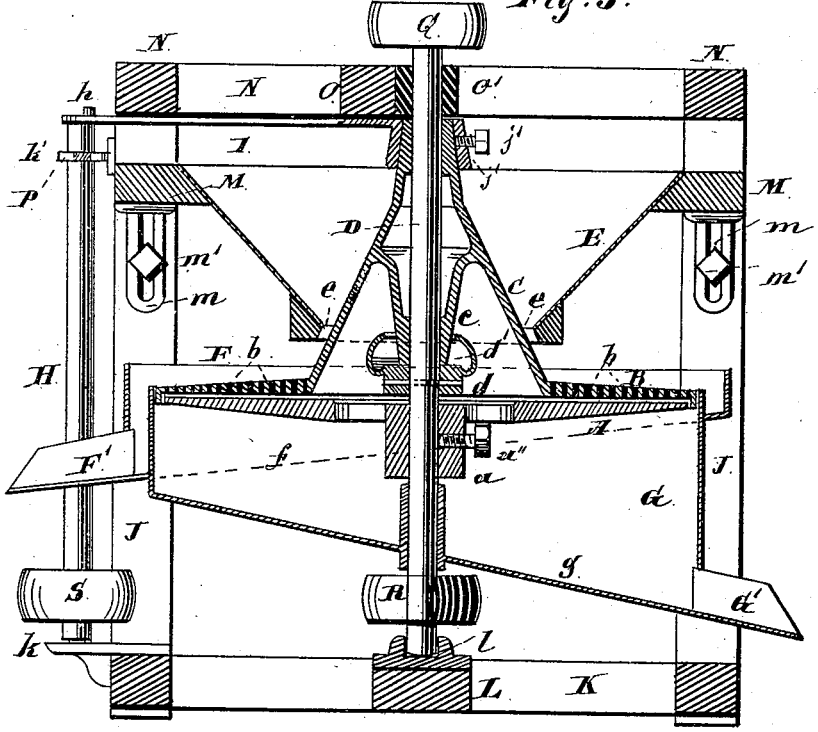
Figure 4:
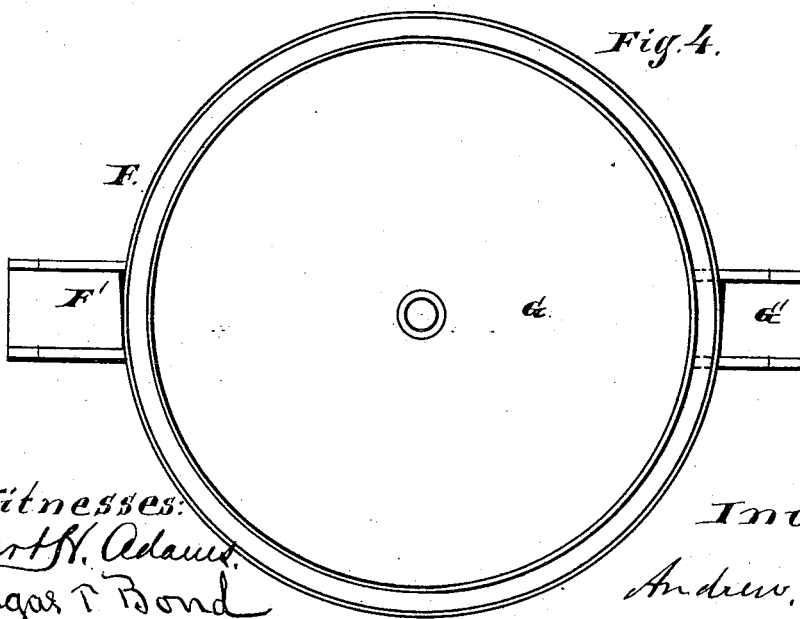
Figure 5:
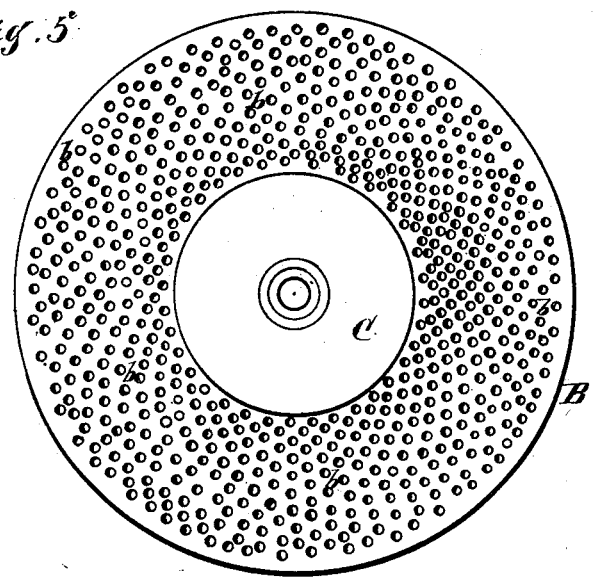
Figure 6:
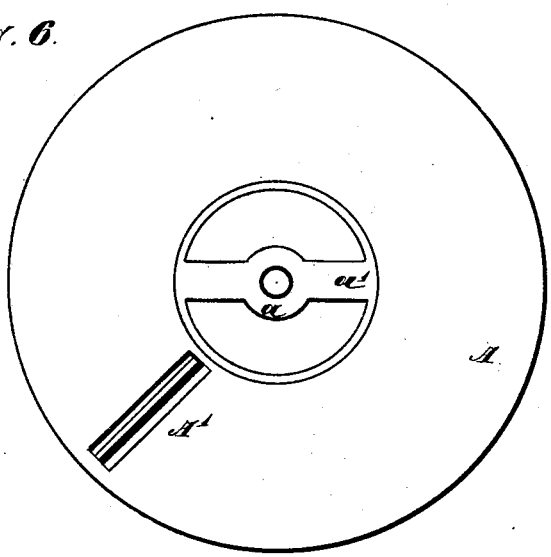
Figure 8:
Figure 7:

Figure 1 is a top or plan view; Fig. 2, a side elevation; Fig. 3, a vertical section on line $xx$ of Fig. 1; Fig. 4, a top or plan view of the receptacles for the uncut and cut material; Fig. 5, a top or plan view of the feed plate or disk; Fig. 6, a top or plan view of the cutting plate or disk; Fig. 7, an edge view of the cutting-plate; Fig. 8, a detail in section, showing the portion of the cutting knife or blade.

This invention relates to a machine or mill more particularly designed or intended to be used in cutting oats for the production of oatmeal, but which may be used for cutting other cereals and other substances for the production of grits, and for other purposes, and has for its objects to construct a machine or mill which will do the required work efficiently and in a reliable manner; to improve the cutting operation by producing a cleaner and better cut, and one which will cause the machine to act rapidly in performing the work, and thereby increase the cutting properties; to improve the delivery or feed of the material to the cutting devices by having such delivery or feed conform to or agree with the cutting, and to improve generally the devices and means by which the cutting and feeding are accomplished. These objects I attain by the mechanism illustrated in the accompanying drawings, which mechanism I will now proceed to describe in detail.

In the drawings, A represents the cutting plate or disk; A', the blade or knife; B, the feeding plate or disk; C, the feeding and distributing cone; D, the shaft for the cutting plate or disk; E, the hopper; F, the receptacle for the uncut material; F', the discharge or spout of the receptacle F; G, the receptacle for the cut material; G', the discharge or spout for the receptacle G; H, the shaft for operating the feed plate or disk; I, the pitman or reciprocating bar; J, the vertical or upright pieces of the frame; K, the bottom pieces of the frame; L, the bottom cross-piece supporting the shaft D; M, the cross-pieces supporting the hopper; N, the upper cross-pieces of the frame-work; O, the cross-piece supporting the upper end of the shaft D; O', the journal-box or bearing of the shaft D; P, the bar supporting the upper end of shaft H; Q R S, the driving-pulleys for the shafts D H; $a$, the hub or boss at center of the cutting disk or plate; $a''$, the set-screws for locking the plate or disk A to the shaft D; $b$, the holes or perforations in the plate or disk B; $c$, the bearing or pivot for the feed plate or disk B; $d$, the support for the bearing $c$; $d'$, the receptacle for the oil or other lubricant; $e$, the discharge-passage for the hopper; $f$, the bottom of the receptacle F; $g$, the bottom of the receptacle G; $h$, the crank or wrist pin; $i$, the slot in the pitman I for the pin $h$; $j$, the collar on the pitman I for attachment to the cone C; $j'$, the set-screw for locking the collar $j$ to the cone C; $k\ k'$, the bearings or journal-boxes for the shaft H; $l$, the bearing for the lower end of the shaft D; $m$, the slotted brackets of the cross-bars M; $m'$, the set-screws or bolts for holding the brackets $m$ in position.

The cutting disk or plate A may be made of steel, or any other suitable material that will not break easily in use, and in diameter it may be varied to suit machines or mills of different sizes and the capacity which it is desired such machines or mills shall have. Its upper face is left flat and straight, or in a level plane, and its under face may be of the form shown—thicker at the center than at the periphery, or any other suitable form. As shown, it is attached to the shaft by which it is carried by a central hub or boss, $a$, and a set-screw, $a''$, the hub or boss having a central circular opening for the shaft; but this plate A may be attached in some other suitable manner, and by other devices than the hub or boss and the set-screw, so long as its attachment to the shaft is a rigid one which will unite the two in a firm manner. This plate A, as shown, is provided with a tangential inclined slot extending from near its periphery nearly to the periphery of the central opening therein, and to the lower inclined face of this opening, as shown, is secured a blade or knife, A', the attachment shown being by means of set-screws; but it may be in some other suitable manner. The cutting-edge of this blade or knife A' projects above the face of the plate or disk the distance required to cut or slice the material, and it can be so attached and formed as to be adjustable in respect to the amount or degree of cut.

This blade or knife A' may be of the form shown, or of some other suitable form, and may be located on the plate A in the manner shown, or in some other suitable and desirable manner, so long as it stands tangential, or nearly tangential, and has its cutting-edge standing forward or in the direction of the rotation, the line of tangential direction being either toward or from the center of the plate or disk.

The plate or disk B may also be made of steel or any other suitable material which can be perforated or filled with holes $b$ without impairing its strength to an extent sufficient to render it fragile and easily broken or damaged in use.

The perforations or holes $b$ may be formed by boring, drilling, or otherwise, and are to be of sufficient size to allow the oats, &c., to pass readily and freely and be presented below the under surface of the plate, so as to be cut or severed by the action of the blade or knife. This plate or disk B is located over, and in close proximity to, the plate or disk A, its under face being flat and straight or in a level plane, and lying parallel with the upper face of the plate or disk A, and these plates or disks A B are so set or arranged in relation to each other as to leave a space between their parallel faces, into which the cutting blade or knife projects, with its cutting-edge in proper relation to the face of the plate B to perform its work without striking or rubbing against the face of the plate. This plate or disk B, as shown, has at its periphery a downwardly-projecting rim or flange, which extends over the edge or periphery of the plate or disk A, a space being left between the edge of the plate and the face of the flange for the discharge of the cut material at this point; but this rim or flange can be omitted, if so desired, as it performs no special function or office, so far as the operation of the machine is concerned, except to form a guard to prevent the cut material from being flung or thrown by the rotation of the plate or disk A outside or over the receptacle therefor, and forms a guide to direct the material into the receptacle; but these objects could be accomplished in some other manner. As shown, this plate or disk B is in the form of an annular rim or ring, the width of which is somewhat greater than the length of the cutting blade or knife, between the inner and outer edges of which, and entirely around, are the perforations or holes $b$, which occupy a width of space equal, or nearly so, to the length of the blade or knife, so as to present the material within the circle which the blade or knife describes in its rotation; and the upper face of this plate or ring is inclined or beveled, to facilitate and insure the travel of the material thereover from its inner edge or point where received to its outer edge or periphery, during which travel the separate grains or particles will enter some one of the perforations or holes $b$ and be cut or severed by the action of the blade or knife. At the center or inner edge of this plate or disk, and extending upward, is located a circular conical-shaped or tapering center or block C; and, as shown, the plate or ring and the cone are formed together or in one piece; but they might be made of separate pieces suitably united one to the other. This cone C extends some distance up into the hopper, and acts as a guide or distributer to take the material from the hopper and pass it downward and outward onto the face of B and insure its being distributed over the entire surface of the plate in every direction. This cone C and the plate or disk B are located around the shaft D, to which shaft the plate or disk A is firmly secured, which shaft, at its lower end, is stepped or journaled in a plate or bearing, $e$, located on the cross piece or beam L of the frame-work, and its upper end is journaled or supported in a suitable journal-box or bearing, O', located on a cross-piece, O; but this shaft may be journaled or supported in some other suitable manner, so as to keep the shaft in a vertical position.

As shown, the plate and cone are held in position around the shaft, and supported by a depending conical-shaped or tapering circular boss or teat, extending down from the interior of the cone and having a circular opening for the passage of the shaft, the lower end of which boss or teat enters an opening in the top of the shell or rim portion $d'$ of a ring or collar, $d$, and bears or rests on the face or end of the ring, and serves as a pivot or center on which the plate and cone can oscillate.

The ring or collar $d$, as shown, is rigidly secured to the shaft by a pin passing through the sides of $d$ and the shaft; but it can be secured by a set-screw or otherwise so as to be adjustable on the shaft; or it can be left loose and its lower end allowed to rest on the end of the hub or center $a$ of the plate A, the collar being projected somewhat below the plane of the plate B, or the hub above the plane of the plate A, so as to leave a space between the plates for the blade or knife, as before described. When the collar $d$ is fast on the shaft the necessary adjustment for space between the plates is made by raising or lowering the plate A, and when the collar $d$ is adjustable such adjustment can be made by raising or lowering the collar $d$ or the plate A, as may be the most convenient. The interior of the shell or rim $d'$ forms a receptacle for oil or other lubricant, by which the pivot or bearing $e$, on which the plate B oscillates, will be kept thoroughly lubricated.

Around the cone C is located the hopper E, which may be made of sheet metal or other suitable material, and in the ordinary form, with sloping sides, an open top, and a discharge-opening at the bottom, into which the cone passes, and may be of a circular shape, or any other shape that will allow the material to readily pass therefrom. As shown, this hopper is adjustable vertically up or down, so as to change the width of the space $e$ between the cone and the hopper mouth or discharge to regulate the feed; but this change in the size of the opening could be made by having the hopper stationary and raising or lowering the cone on the shaft D.

As shown, the hopper is attached, at its upper end, to cross-bars M, which bars are attached at their ends to the vertical posts or uprights J of the frame by slotted brackets or angle-irons $m$ and a tightening bolt or screw, $m'$, passing through the slot of the bracket or iron into the respective posts or uprights, so that by loosening the bolts or screws the cross-pieces M can be raised or lowered to raise or lower the hopper; but these cross-pieces M might be attached in some other manner so as to be adjustable, or the hopper might be made so as to be adjustable thereon.

The end of the cone C, above the taper, is projected upward, and to this projecting end, in the form of construction shown, is securely fastened a collar or ring, $j$, by means of a set-screw, $j'$, or in some other suitable manner, which collar or ring $j$ is on one end of a connecting-bar or pitman, I, the other end of which is provided with a slot, $i$, which receives a crank-pin, $h$, on the end of a shaft, H, so that by the rotation of the shaft the pitman or bar I is given a reciprocating movement, which imparts an oscillating movement to the cone C and plate, disk, or ring B. The shaft H is journaled or supported, at its lower end, in a suitable plate or bearing, $k$, located on the framework, and its upper end, as shown, is journaled or passes through a bearing or support, $k'$, on a bar, P, secured at its ends to the framework; but this shaft H can be journaled or supported in some other manner that will retain it in a vertical position and leave it free to rotate, and instead of a crank-pin, $h$, on the end of the shaft H, a crank with a pin to enter the slot $i$ could be used; or some other form of attachment for the bar I to the shaft that will give the bar a reciprocating movement can be provided.

Around the plate or disk B is located a receptacle, F, having a spout or other discharge, F', and around the plate or disk A is located a receptacle, G, also having a spout or discharge, G', the receptacles being so located in relation to each other that the spouts will not be in line vertically. As shown, they are located so as to bring the spouts on opposite sides of the receptacles. As shown, these receptacles are circular in form, and are united one to the other, the wall or rim of the receptacle G passing through and being joined or attached to the bottom $f$ of the receptacle F in any suitable manner, and when so joined the same movement which operates one will operate both; but they might be independent and be given independent movements. The wall or rim of the receptacle G extends up, so as to be just below or in the same plane as the upper face of the plate B at the edge, and this wall or rim completely encircles the plate or disk A, and incloses said plate, with a space between it and the periphery of the plate, so as to receive and catch the cut material, the extension of the wall or rim above the plate preventing the escape of the material thrown out from the periphery by the rotation of the plate. The wall or rim of the receptacle F extends up some distance above the plane of the plate or disk B, and this wall or rim completely encircles such plate, with a space between it and the periphery of the plate and outside of the wall or rim of G, which forms a receptacle in which any uncut material which may roll or fall off the plate B will be deposited and caught. The bottoms $f$ and $g$ of these receptacles, respectively, are inclined somewhat, as shown, so as to insure the travel of the material caught in either receptacle toward the spout or discharge to pass from the receptacles respectively.

Both receptacles, as shown, are supported and held in position around the shaft D by a collar or sleeve located at the center of the bottom $g$ of the receptacle G, through which the shaft D passes loosely, the end of the collar resting on the face of the pulley R, or on a ring or flange formed on the shaft D, or being supported in some other suitable manner. These receptacles may be given an oscillating movement by attaching the wall or rim of the receptacle G to the edge of the plate B by riveting or bolting it to the depending flange on such plate, or by otherwise fastening it, so that when the plate is oscillated the receptacles will oscillate therewith; or these receptacles can be oscillated by a pitman or bar connected with the collar or sleeve, or otherwise, and with the shaft H, so as to be operated in a manner similar to the pitman or bar I, and give the receptacles an oscillating movement, which movement is for the purpose of causing the material in the respective receptacles to travel down the inclined bottoms $f g$ and pass out through the spouts or discharge-openings F' G'.

The frame-work may be of any form of construction suitable to receive and support the operating devices. As shown, it consists of vertical corner posts or pieces J with horizontal bottom pieces, K, and horizontal top pieces, N, with an upper and lower cross-piece, L and O, to support the shaft D, and cross-piece M to support the hopper.

The shaft D may be driven from the pulley Q, over which a belt passes from some suitable driving power, or it may be driven in some other suitable manner, and the shaft H may be driven from the shaft D by a belt passing over the pulleys R S.

The operation will be readily understood from the foregoing description. The shaft D is rotated and imparts a rotary movement to the plate or disk A, carrying the knife A', and at the same time the shaft H by its rotation operates the pitman or bar I and gives the plate, disk, or ring B an oscillating movement, causing the material, as it passes from the hopper E through the opening e, and is distributed over the surface of B by the action of the cone, to enter the perforations or holes b and project below the under surface of the plate B in position for the blade or knife A' to act and cut or sever such projecting portion, which, with the portion from which it is severed, falls on and is deposited in the receptacle G, from which it is discharged through the spout or opening G'.

The object in placing the spouts or openings F' G' on opposite sides, or out of a vertical line, is to prevent the uncut material from being discharged into the cut material.

By giving the blade or knife a rotary movement and setting it so that it stands tangential, it will be seen that the cutting action will be a drawing one, making a clean, clear, and perfect cut, and one which will not act to simply crush the material without cutting.

The plate B should have a sufficient oscillation to give the material a stirring movement and cause the grains or particles to enter the perforations or holes; but such movement should not be so great as to fling or throw the material off at the outer edge or periphery to any great extent.

If found desirable, more than one blade or knife A' can be used, such additional blades or knives being set tangential in a manner corresponding to the knife A'; but ordinarily, and for general use, a single blade or knife will be found sufficient, as such blade or knife will act to cut the material as fast as projected or delivered by the plate B.

What I claim as new, and desire to secure by Letters Patent, is—

1. In a machine for cutting grain, the combination of a feeding plate or disk provided at its center with a conical-shaped portion with mechanism for imparting an oscillating movement to said plate or disk, substantially as and for the purpose described.

2. In a machine for cutting grain, the combination of a feeding plate or disk provided at its center with a conical-shaped portion with the rotary plate or disk provided with an attached cutter or knife, and mechanism for imparting to the same its rotary movement, substantially as and for the purpose described.

3. The combination of the plate or disk B, provided with holes or perforations b, mechanism for imparting an oscillating movement to said plate or disk, and the receptacle F, for catching and saving any of the material which may roll or fall off without being cut, substantially as described.

4. A rotary plate or disk carrying a cutting blade or knife, in combination with a feeding plate or disk having a central conical-shaped portion, and suitable devices for rotating the cutting plate or disk and oscillating the feeding plate or disk, substantially as and for the purposes specified.

5. The plate or disk A, carrying the blade or knife A', and rotary shaft D, in combination with the plate or disk B, having a central conical portion, C, shaft H, having a crank or crankpin, h, and connecting-bar or pitman I, substantially as and for the purposes specified.

6. The combination, with plate or disk A, carrying the cutting blade or knife, and devices for rotating said plate or disk, of the receptacle G, having an annular wall or rim extending upward and encircling the periphery of the cutting plate or disk, substantially as and for the purpose described.

7. The combination of the plate or disk A, carrying a cutting blade or knife, the feeding plate or disk B, provided with holes or perforations b, mechanism for imparting a rotary motion to the cutting plate or disk and an oscillating movement to the feeder-plate, and the receptacles F and G, located around the said plates or disk, for catching the cut and uncut material, substantially as described.

8. The combination of the plate or disk B, having a central conical portion, C, and provided with perforations or holes b, and mechanism for oscillating said plate or disk, with the vertically-adjustable hopper E, arranged around the cone, for varying the amount of feed, substantially in the manner described.

ANDREW WEMPLE.

Witnesses:
ALBERT H. ADAMS,
EDGAR T. BOND.